US009236986B2

(12) United States Patent
Park

(10) Patent No.: US 9,236,986 B2
(45) Date of Patent: Jan. 12, 2016

(54) METHOD AND APPARATUS FOR CONTROLLING DATA TRAFFIC IN A TDD SYSTEM THAT USES MULTI-COMPONENT CARRIERS

(75) Inventor: Donghyun Park, Seoul (KR)

(73) Assignee: Pantech Co., Ltd., Seoul (KR)

( * ) Notice: Subject to any disclaimer, the term of this patent is extended or adjusted under 35 U.S.C. 154(b) by 189 days.

(21) Appl. No.: 14/128,449

(22) PCT Filed: Jun. 20, 2012

(86) PCT No.: PCT/KR2012/004868
§ 371 (c)(1),
(2), (4) Date: Dec. 20, 2013

(87) PCT Pub. No.: WO2012/177042
PCT Pub. Date: Dec. 27, 2012

(65) Prior Publication Data
US 2014/0119248 A1 May 1, 2014

(30) Foreign Application Priority Data

Jun. 23, 2011 (KR) ........................ 10-2011-0061043

(51) Int. Cl.
*H04L 5/00* (2006.01)
*H04B 7/26* (2006.01)
*H04L 5/14* (2006.01)

(52) U.S. Cl.
CPC ............ *H04L 5/0044* (2013.01); *H04B 7/2615* (2013.01); *H04L 5/14* (2013.01)

(58) Field of Classification Search
None
See application file for complete search history.

(56) References Cited

U.S. PATENT DOCUMENTS

| 8,705,413 B2* | 4/2014 | Li et al. .......................... 370/280 |
| 8,792,370 B2* | 7/2014 | Zhang et al. ................... 370/252 |
| 2010/0290372 A1 | 11/2010 | Zhong et al. |
| 2011/0032853 A1 | 2/2011 | Moon et al. |
| 2011/0228732 A1* | 9/2011 | Luo et al. ...................... 370/329 |
| 2011/0261679 A1* | 10/2011 | Li et al. .......................... 370/216 |
| 2011/0261714 A1 | 10/2011 | Pan et al. |

FOREIGN PATENT DOCUMENTS

| CA | 2 781 964 | 6/2011 |
| WO | 2010/051752 | 5/2010 |
| WO | 2011/065703 | 6/2011 |

OTHER PUBLICATIONS

International Search Report mailed on Dec. 26, 2012 in International Application No. PCT/KR2012/004868.

* cited by examiner

*Primary Examiner* — Ian N Moore
*Assistant Examiner* — Jenee Williams
(74) *Attorney, Agent, or Firm* — H.C. Park & Associates, PLC

(57) ABSTRACT

The present invention relates to a method and apparatus for controlling data traffic in a time-division duplex (TDD) system that uses multi-component carriers. The method for controlling data traffic in a TDD system that uses multi-component carriers according to one embodiment of the present invention comprises the steps of: a base station transmitting, to a user equipment, a wireless signal including data through one or more component carriers among a component carrier group including a first element carrier which is a primary cell (PCell) and a second element carrier (SCell) which is a secondary cell, wherein the Pcell and the Scell consist of uplink and downlink subframes in a time division duplex system; and the base station receiving, from the user terminal, a wireless signal including response control information for the data through the second component carrier.

8 Claims, 14 Drawing Sheets

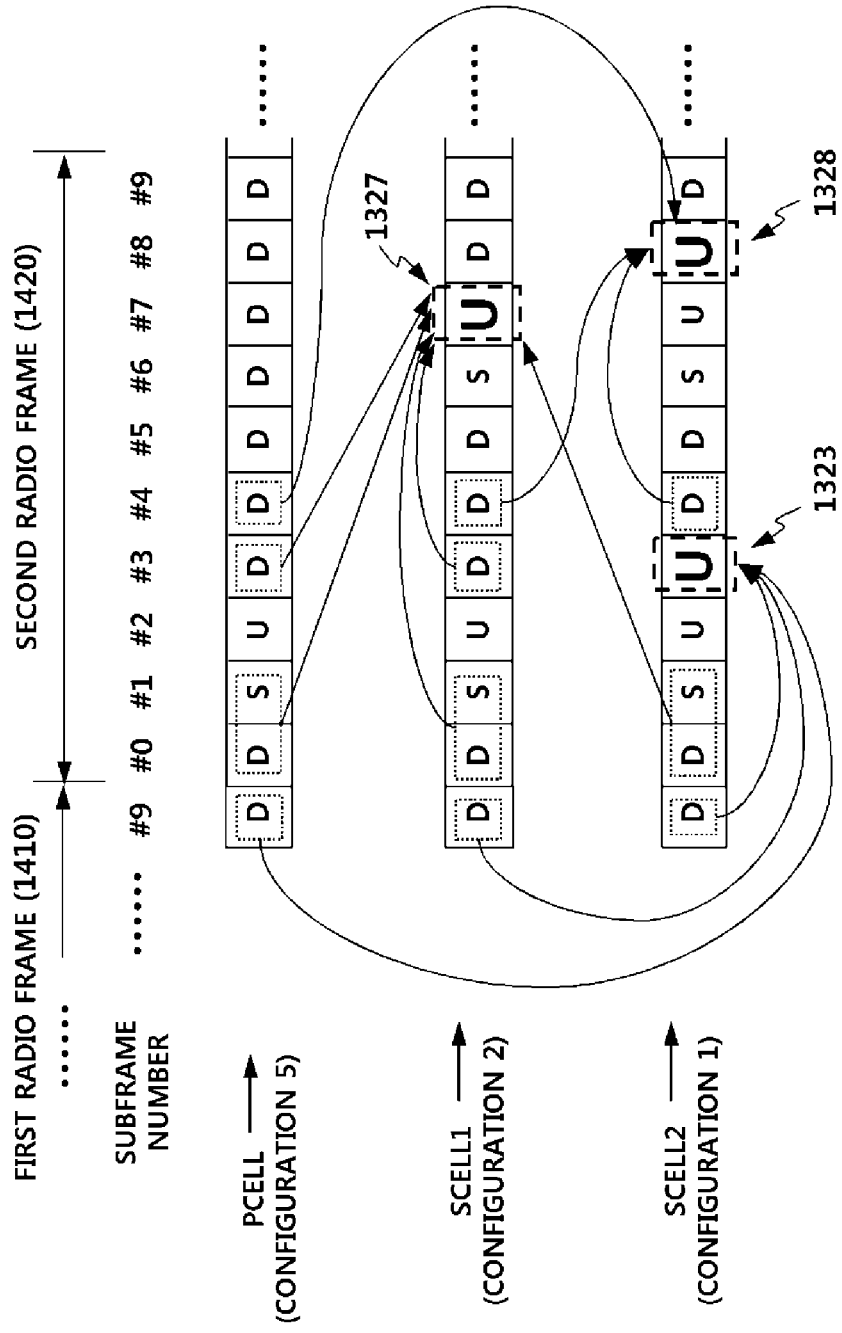

METHOD AND APPARATUS FOR CONTROLLING DATA TRAFFIC IN A TDD SYSTEM THAT USES MULTI-COMPONENT CARRIERS

CROSS-REFERENCE TO RELATED APPLICATIONS

This application is the National Stage Entry of International Application PCT/KR2012/004868, filed on Jun. 20, 2012, and claims priority from and the benefit of Korean Patent Application No. 10-2011-0061043, filed on Jun. 23, 2011, both of which are incorporated herein by reference for all purposes as if fully set forth herein.

BACKGROUND

1. Field

The present invention relates to a method and an apparatus for controlling data traffic so as to enable the transmission of response control information through several component carriers in a Time Division Duplex (TDD) system using one component carrier or multiple component carriers.

2. Discussion of the Background

With the progress of communication systems, consumers such as companies and individuals have used a wide variety of wireless terminals. Current mobile communication systems such as 3$^{rd}$ Generation Partnership Project Long Term Evolution (3GPP LTE) and 3GPP LTE Advanced (LTE-A), need to develop a technology for a system capable of transmitting a large amount of data coming close to that transmitted through a wired communication network, as a high-speed and high-capacity communication system capable of transmitting and receiving various data such as images and wireless data beyond voice-oriented services. Data can be efficiently transmitted through multiple component carriers in a scheme for transmitting a large amount of data. Meanwhile, a TDD system which uses a particular frequency band to transmit and receive data can transmit and receive data in such a manner that the particular frequency band is divided into time slots. In this case, in the TDD system, a timing of transmitting response information to the transmission and reception of data may change according to a scheme for setting uplink (UL) and downlink (DL). Meanwhile, the setting of a scheme for transmitting the response information in the TDD system using multiple component carriers may affect the efficiency of an overall network. Accordingly, the TDD system using multiple component carriers needs to precisely set the scheme for transmitting the response information.

SUMMARY

Therefore, an aspect of the present invention is to provide a method and an apparatus for controlling data traffic in a TDD system using multiple component carriers in order to efficiently allocate response control information.

Another aspect of the present invention is to implement a configuration in which, in the case of using one or more component carriers, uplink subframes can be located at various positions by causing component carriers to have different TDD configurations, and thereby response control information is transmitted through uplink subframes of multiple cells or multiple component carriers rather than through an uplink subframe of a particular cell or a particular component carrier.

In accordance with an aspect of the present invention, there is provided a method for controlling data traffic by a base station in a Time Division Duplex (TDD) system using multiple component carriers. The method includes: transmitting a wireless signal including data to a user equipment through any one or more component carriers in a component carrier set which comprises a first component carrier corresponding to a primary cell and a second component carrier corresponding to a secondary cell, in which uplink and downlink subframes are configured according to a TDD scheme; and receiving a wireless signal including response control information to the data from the user equipment through the second component carrier, wherein the second component carrier is different in band from the first component carrier, the second component carrier has a TDD configuration which is different from a TDD configuration of the first component carrier in terms of a structure of downlink and uplink subframes, and an uplink subframe different from an uplink subframe of the first component carrier exists in the second component carrier.

In accordance with another aspect of the present invention, there is provided a method for controlling data traffic by a user equipment in a Time Division Duplex (TDD) system using multiple component carriers. The method includes: receiving a wireless signal including data from a base station through any one or more component carriers in a component carrier set which comprises a first component carrier corresponding to a primary cell and a second component carrier corresponding to a secondary cell, in which uplink and downlink subframes are configured according to a TDD scheme; and transmitting a wireless signal including response control information to the data to the base station through the second component carrier, wherein the second component carrier is different in band from the first component carrier, the second component carrier has a TDD configuration which is different from a TDD configuration of the first component carrier in terms of a structure of downlink and uplink subframes, and an uplink subframe different from an uplink subframe of the first component carrier exists in the second component carrier.

In accordance with still another aspect of the present invention, there is provided a base station, which includes: a transmitter for transmitting a wireless signal to a user equipment; a receiver for receiving a wireless signal from the user equipment; and a controller for controlling a transmitter to transmit a wireless signal including data to a user equipment through any one or more component carriers in a component carrier set which comprises a first component carrier corresponding to a primary cell and a second component carrier corresponding to a secondary cell, in which uplink and downlink subframes are configured according to a Time Division Duplex (TDD) scheme, and for controlling the receiver to receive response control information to the data from the user equipment through the second component carrier, wherein the second component carrier is different in band from the first component carrier, the second component carrier has a TDD configuration which is different from a TDD configuration of the first component carrier in terms of a structure of downlink and uplink subframes, and an uplink subframe different from an uplink subframe of the first component carrier exists in the second component carrier.

In accordance with yet another aspect of the present invention, there is provided a user equipment, which includes: a transmitter for transmitting a wireless signal to a base station; a receiver for receiving a wireless signal from the base station; and a controller for controlling the receiver to receive a wireless signal including data from the base station through any one or more component carriers in a component carrier set which comprises a first component carrier corresponding to a primary cell and a second component carrier corresponding to a secondary cell, in which uplink and downlink subframes are configured according to a Time Division Duplex (TDD) scheme, and for controlling a transmitter to transmit a wireless signal including response control information to the data to the base station through the second component carrier, wherein the second component carrier is different in band from the first component carrier, the second component carrier has a TDD configuration which is different from a TDD configuration of the first component carrier in terms of a structure of downlink and uplink subframes, and an uplink subframe different from an uplink subframe of the first component carrier exists in the second component carrier.

BRIEF DESCRIPTION OF THE DRAWINGS

FIG. 14 is a view illustrating a process for transmitting response control information when different TDD configurations are applied to multiple cells, according to still another embodiment of the present invention.

DETAILED DESCRIPTION OF THE ILLUSTRATED EMBODIMENTS

Figure 1:
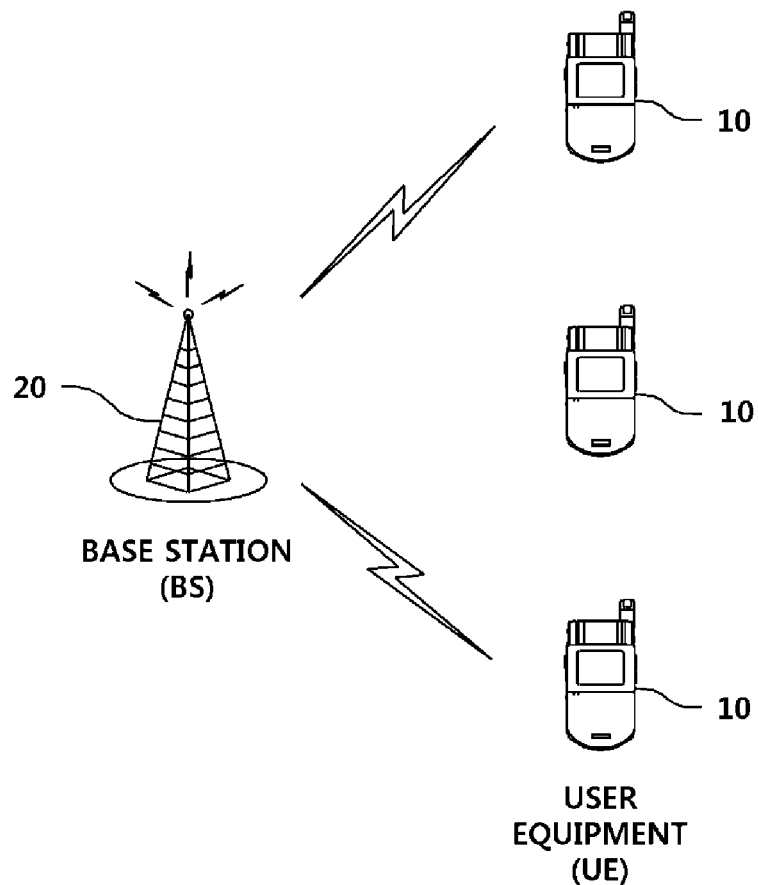
FIG. 1 illustrates a wireless communication system, to which embodiments of the present invention are applied.

Hereinafter, exemplary embodiments of the present invention will be described in detail with reference to the accompanying drawings. It should be noted that in assigning reference numerals to elements in the drawings, the same elements will be designated by the same reference numerals although they are shown in different drawings. Further, in the following description of the present invention, a detailed description of known functions and configurations incorporated herein will be omitted when it may make the subject matter of the present invention rather unclear.

FIG. 1 illustrates a wireless communication system, to which embodiments of the present invention are applied.

The wireless communication system is widely arranged in order to provide various communication services, such as voice, packet data, and the like.

Referring to FIG. 1, the wireless communication system includes a User Equipment (UE) 10 and a Base Station (BS) or an evolved Node-B (eNB) 20. In this specification, the UE 10 has a comprehensive concept implying a user terminal in wireless communication. Accordingly, the UEs should be interpreted as a concept including a Mobile Station (MS), a User Terminal (UT), a Subscriber Station (SS), a wireless device, and the like in Global System for Mobile Communications (GSM) as well as User Equipments (UEs) in Wideband Code Division Multiple Access (WCDMA), Long Term Evolution (LTE), High Speed Packet Access (HSPA), and the like.

The BS 20 or a cell usually refers to a station communicating with the UE 10, and may be called different terms, such as a Node-B, an eNB, a sector, a site, a Base Transceiver System (BTS), an Access Point (AP), and a relay node.

Specifically, in this specification, the BS 20 or the cell should be interpreted as having a comprehensive meaning indicating a partial area or a function covered by a Base Station Controller (BSC) in Code Division Multiple Access (CDMA), by a Node-B in Wideband Code Division Multiple Access (WCDMA), or by an eNB or a sector (or a site) in LTE.

Accordingly, the BS 20 or the cell has a comprehensive meaning including various coverage areas such as a megacell, a macrocell, a microcell, a picocell, a femtocell, a communication range of a relay node, and the like.

In this specification, the UE 10 and the BS 20, which are two transmission and reception subjects used to implement the art or the technical idea described in this specification, are used as a comprehensive meaning, and are not limited by a particularly designated term or word. Here, uplink (UL) signifies a scheme in which the UE 10 transmits and receives data to the BS 20, and downlink (DL) signifies a scheme in which the BS 20 transmits and receives data to the UE 10.

The wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM (Orthogonal Frequency Division Multiplexing)-FDMA, OFDM-TDMA, and OFDM-CDMA.

Uplink transmission and downlink transmission may be performed based on a TDD (Time Division Duplex) scheme that performs transmission based on different times, or based on an FDD (Frequency Division Duplex) scheme that performs transmission based on different frequencies.

An embodiment of the present invention may be applied to the allocation of resources in the field of asynchronous wireless communications which is advanced through GSM, WCDMA and HSPA, and evolve into LTE and LTE-advanced, and in the field of synchronous wireless communications which evolve into CDMA, CDMA-2000 and Ultra Mobile Broadband (UMB). The present invention should not be interpreted as being limited to or restricted by a particular wireless communication field, but should be interpreted as including all technical fields to which the spirit of the present invention can be applied.

Meanwhile, in LTE, a standard is established by configuring uplink and downlink based on one component carrier or one component carrier pair. In uplink and downlink, control information is transmitted through a control channel, such as a Physical Downlink Control CHannel (PDCCH), a Physical Control Format Indicator CHannel (PCFICH), a Physical Hybrid ARQ Indicator CHannel (PHICH), a Physical Uplink Control CHannel (PUCCH), or the like. Also, a data channel, such as a Physical Downlink Shared CHannel (PDSCH), a Physical Uplink Shared CHannel (PUSCH), or the like, is configured, and then is used to transmit data.

In LTE, a standard regarding a single component carrier forms the basis of LTE and a combination of a couple of bandwidths, each having a bandwidth smaller than 20 MHz is discussed, whereas in LTE-A, bandwidths of component carriers, each having a bandwidth equal to or greater than 20 MHz is being discussed. In LTE-A, multi-Carrier Aggregation (hereinafter referred to as "CA") is basically discussed by considering the best backward compatibility based on the base standard of LTE, and a maximum of five carriers are considered in uplink and downlink. It goes without saying that the number (e.g., 5) of component carriers may increase or decrease depending on a system environment. However, embodiments of the present invention are not limited thereto. Hereinafter, the term "component carrier set" refers to a set including two or more component carriers configured to be used in the relevant system.

In CA, multiple points considered in relation to the design of a control channel include a point regarding the transmission of an uplink ACKnowledgement/Negative ACKnowledgement (ACK/NACK) signal, and a point regarding the transmission of uplink channel information including a Channel Quality Indicator (CQI), a Precoding Matrix Indicator (PMI), and a Rank Indicator (RI).

In order to configure CA, LTE-A basically considers backward compatibility with 3GPP LTE Rel-8. CQI/PMI/RI information determined as a standard in LTE Rel-8 is transmitted through a Physical Uplink Control CHannel (PUCCH), which is uplink control channels, and a Physical Uplink Shared CHannel (PUSCH), in various schemes.

A wireless communication system to which embodiments of the present invention are applied can support uplink and/or downlink Hybrid Automatic Repeat Request (HARQ). Also, layers of a radio interface protocol between a UE and a network may be divided into a first layer (L1), a second layer (L2), and a third layer (L3) based on three lower layers of an Open Systems Interconnection (OSI) model, which is widely known in a communication system. A physical layer belonging to the first layer provides an information transmission service using a physical channel.

An embodiment of the present invention may be applied to CA. The term "CA" refers to an environment in which a UE transmits and receives signals to/from a BS through multiple component carriers. The multiple component carriers may exist adjacent to each other, or may exist such that frequency bands of the multiple components are spaced from each other so as not to be adjacent to each other. Also, downlink component carriers exist independently of uplink component carriers, so that the number of downlink component carriers may be equal or not equal to that of uplink component carriers. Meanwhile, the multiple component carriers may include one or more Primary Component Carriers (PCCs) and Secondary Component Carriers (SCCs) which are not PCCs. A main measurement signal or main control information may be transmitted and received through a PCC, and SCCs may be allocated through a PCC. A Primary Cell (PCell) and a Secondary Cell (SCell) may be used in the same meanings as the PCC and the SCC. Hereinafter, a description will focus on a PCell and an SCell, but the description can be identically applied to a PCC and an SCC.

In the case of the CA in LTE-A, because the number of component carriers is plural, the amount of information transmitted through an uplink control channel may be increased by approximately the number of carriers. In the case of the CA in LTE-A, there may exist an asymmetrical situation in which the number of carriers in uplink differs from the number of carriers in downlink. When the amount of information transmitted through an uplink control channel is increased by approximately the number of carriers, even greater inefficiency may occur in allocating resources after configuring a resource block group of each carrier. Accordingly, a description will be made of a method for transmitting response control information when a configuration of TDD is different for each component carrier in order to enable efficient transmission of response control information (i.e., Ack/Nack control data), such as ACK/NACK, which is transmitted through an uplink control channel, even in the asymmetrical situation. Hereinafter, a description will focus on Ack/Nack as an example of response control information.

In this specification, a description will be made of a method capable of efficiently controlling data traffic by using a flexible uplink-downlink configuration between serving cells. Specifically, a description will be made of a detailed method for a transmission timing of response control information (i.e., Ack/Nack control data), such as ACK/NACK, which is generated when different TDD configurations are applied to multiple component carriers. In other words, a transmission timing of response control information in the case of different TDD configurations which are set for the multiple component carriers will be described as follows.

Table 1 below shows TDD configurations according to an embodiment of the present invention. It can be noted from Table 1 below that a transmission timing of uplink-downlink subframes is different for each TDD configuration.

TABLE 1

| | | uplink-downlink configurations | | | | | | | | | |
|---|---|---|---|---|---|---|---|---|---|---|---|
| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, an area in which "D" is entered according to a subframe number represents a downlink subframe, and an area in which "U" is entered according to a subframe number represents an uplink subframe. "S" represents a subframe switching from downlink to uplink, which can operate as in the case of downlink.

TABLE 2

| UL-DL Configuration | downlink association set index K: {$k_0, k_1, \ldots k_{M-1}$} for TDD |
|---|---|

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | — | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 2 shows a timing of A/N transmission, which is considered in current TDD. Referring to Table 2, the A/N transmission through a PDSCH to be transmitted is performed in a downlink subframe indicated by K, according to each TDD configuration, a current subframe n (0~9) and a K set corresponding to the subframe number n.

For example, when the current subframe n is equal to 2 and a TDD configuration is 2, a K set includes 8, 7, 4 and 6. In the present example, M has a value of 4. M represents the number of downlink subframes related to a particular uplink subframe. A/N transmission through a PDSCH which is transmitted in one or more downlink subframes signifies transmission in a particular uplink subframe. The K set {$k_0, k_1, \ldots k_{M-1}$} is defined by the following index. The K set will be described in more detail below with reference to FIG. 2.

Figure 2:
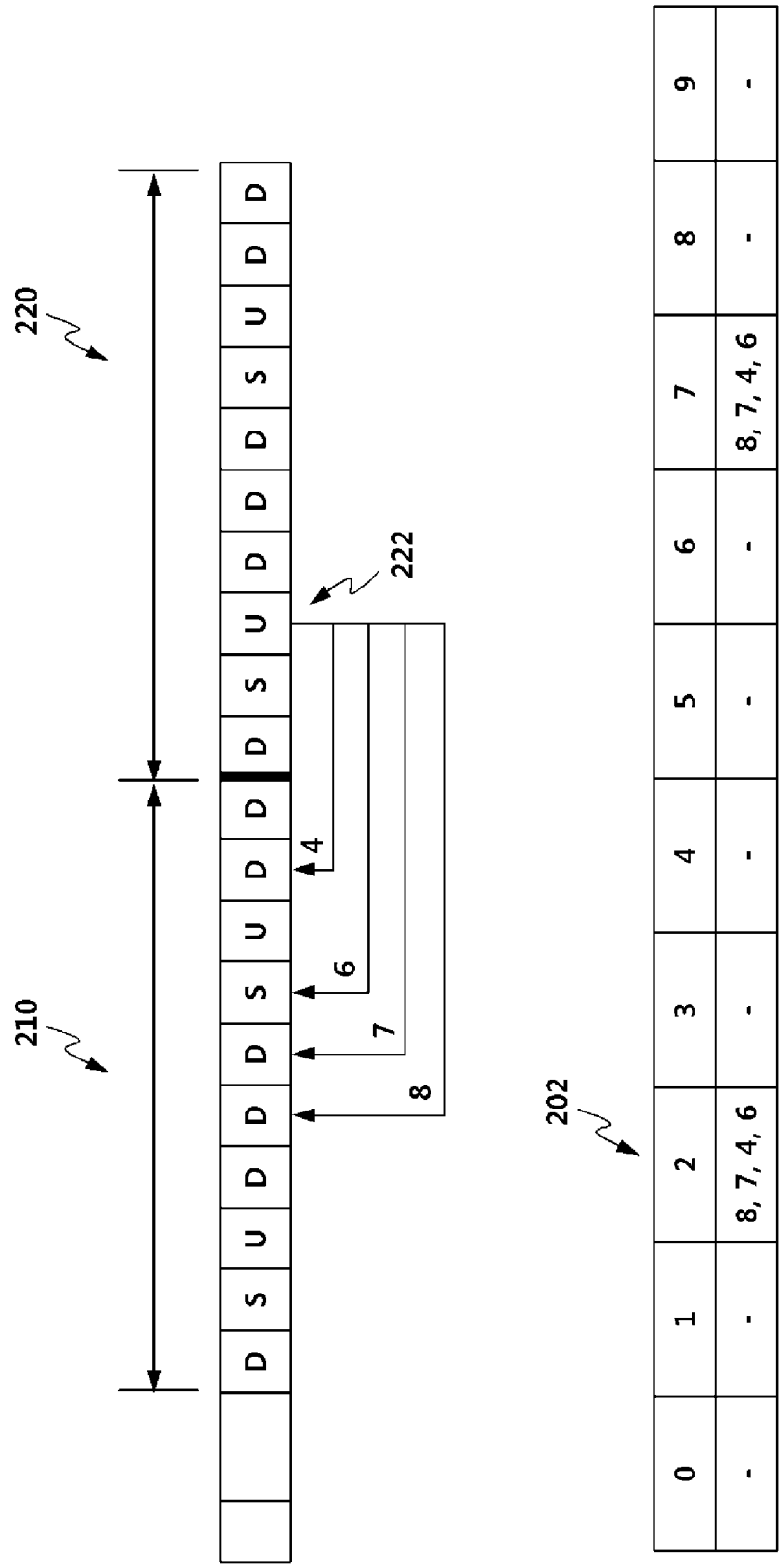
FIG. 2 is a view illustrating a configuration of transmitting response control information in a TDD system.

FIG. 2 is a view illustrating a configuration of transmitting response control information in a TDD system.

Referring to FIG. 2, according to a configuration of 2 shown in Table 1, subframes are formed in such a manner that radio frames 210 and 220 are repeated. In FIG. 2, a subframe #2 222 of the radio frame 220 is an uplink subframe, In this case, 222 on which A/N transmission can be performed (i.e., downlink subframes which is related to the No. 2 subframe 222 are indicated by numbers 8, 7, 4 and 6) as in information 202 according to a configuration of 2 shown in Table 2. Accordingly, A/N for the subframe of 210 preceding by 8, 7, 4 and 6 with the current subframe 222 as a reference is transmitted in the subframe 222.

Hereinafter, among subframes, an uplink subframe will be represented by U, a downlink subframe will be represented by D, and a subframe switching from downlink to uplink will be represented by S.

Meanwhile, when an identical TDD configuration is performed on all component carriers in TDD CA environment, all the component carriers have an identical structure of TDD.

In this case, A/N for each of all configured component carriers transmitted only on a PCell or a primary component carrier, is transmitted at an identical timing and by using the identical number of downlink subframes (i.e., M represents the number of downlink subframes related to one uplink subframe, and particularly has a close relation to A/N transmission). Specifically, when TDD configurations are provided so as not to be identical for all component carriers and A/N transmission is not limited to transmission on a PCell, the different TDD configurations cause a current A/N timing to be more diversified, so that the efficiency of the system can be increased.

Figure 3:
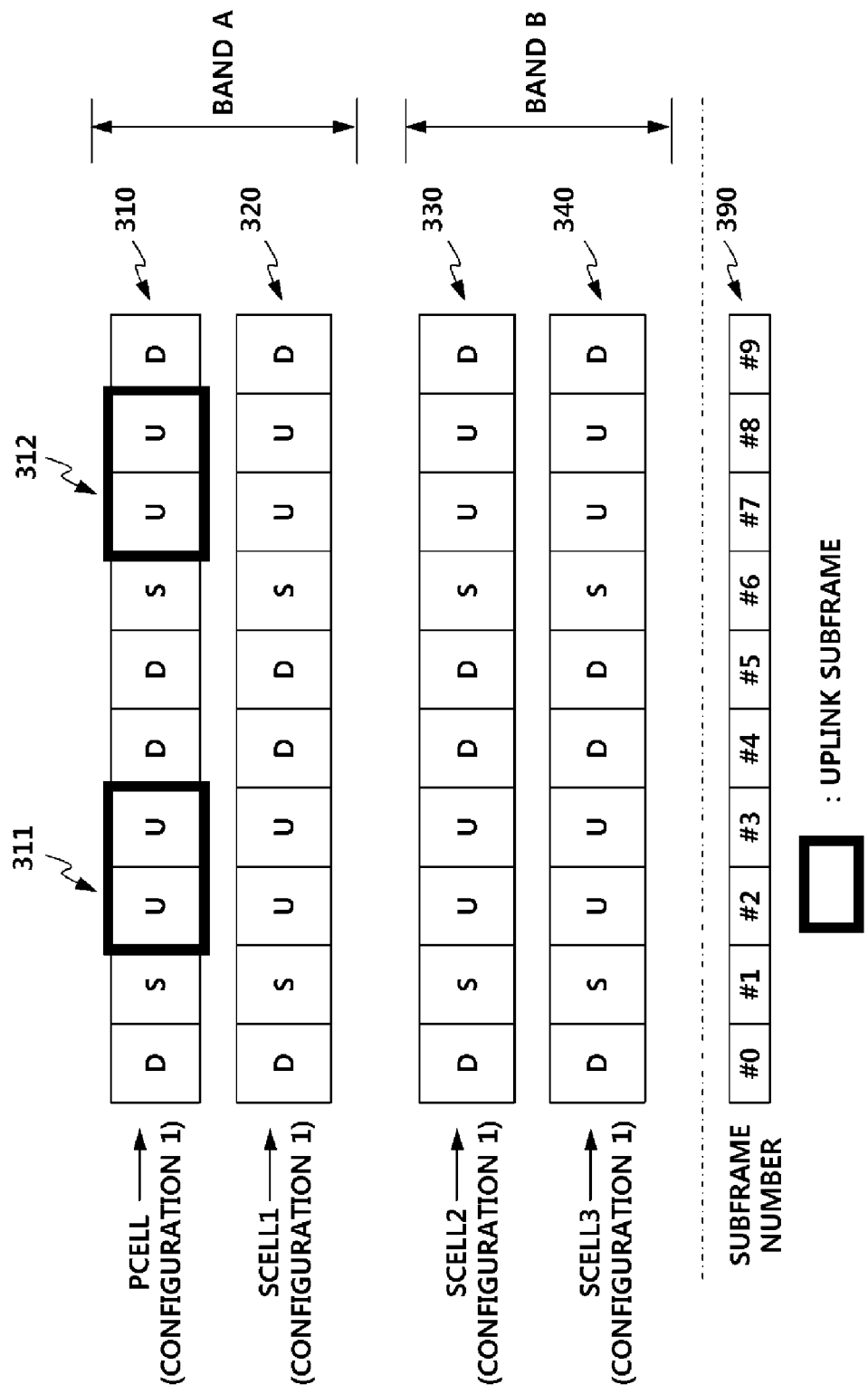
FIG. 3 is a view illustrating a subframe in which A/N is transmitted in the case of an identical TDD configuration.

FIG. 3 is a view illustrating a subframe in which A/N is transmitted in the case of an identical TDD configuration. FIG. 3 illustrates a structure of a component carrier set including four cells. Referring to FIG. 3, a TDD configuration which is set for a PCell, and TDD configurations which are set for SCell1, SCell2 and SCell3 all have a configuration value of 1 shown in Table 2, as designated by reference numerals 310, 320, 330 and 340. In this case, positions of uplink subframes are all identical, and A/N information which is response information of downlink subframes transmitted on all the cells (i.e., PCell, SCell1, SCell2 and SCell3) is all transmitted in uplink subframes 311 and 312 of the PCell. When the A/N information is limited so as to be transmitted in any one subframe at a particular subframe time point, the A/N information may be transmitted on only the PCell in a case of FIG. 3 to which an uplink subframe is allocated at an identical time point. Reference numeral 390 represents subframe numbers of each cell.

Figure 4:
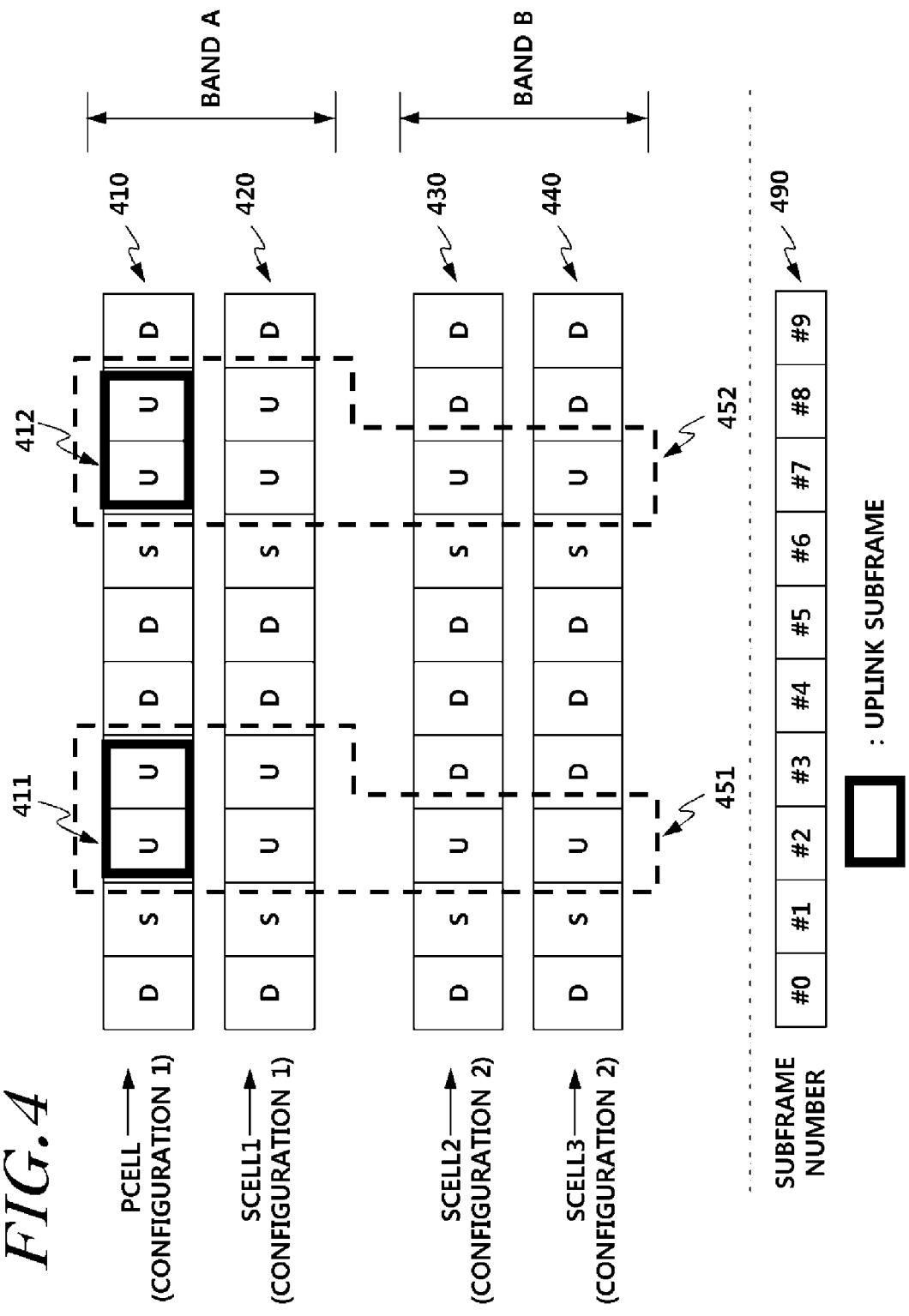
FIG. 4 is a view illustrating a subframe in which A/N is transmitted in the case of different TDD configurations, according to a first embodiment of the present invention.

FIG. 4 illustrates subframes in which A/N information is transmitted when TDD configurations which are not identical are performed on some component carriers in a component carrier set, according to a first embodiment of the present invention. FIG. 4 illustrates a structure of a component carrier set including four cells.

Referring to FIG. 4, a TDD configuration which is set for PCell, and a TDD configuration which is set for SCell1 both have a configuration value of 1 shown in Table 2, as designated by reference numerals 410 and 420. A TDD configuration which is set for SCell2, and a TDD configuration which is set for SCell3 both have a configuration value of 2 shown in Table 2, as designated by reference numerals 430 and 440. A discrimination is made between uplink subframes, as designated by reference numerals 451 and 452. In FIG. 4, a TDD configuration which is set for the PCell has a larger number of uplink subframes than a TDD configuration which is set for SCell2 has, or than a TDD configuration which is set for SCell3 has. Accordingly, it is not required to switch over from PCell to SCell (other than the Pcell) to transmit HARQ A/N information. Accordingly, in the case illustrated in FIG. 4, as designated by reference numerals 411 and 412, A/N information can be transmitted in an uplink subframe of the PCell. In FIG. 4, reference numeral 490 represents subframe numbers of each cell.

Hereinafter, in this specification, a configuration will be described which is not limited to that of the transmission of A/N information on the PCell but enables HARQ A/N transmission to be performed even on an SCell.

In other words, a HARQ A/N timing may be limited according to an actual PCell configuration when HARQ A/N information is transmitted on only the PCell. Accordingly, in order to bring about a faster and more effective HARQ operation, HARQ A/N transmission on an SCell may be allowed in a particular situation. In this situation, criteria based on which a HARQ A/N timing is to be set will be described below.

Hereinafter, an embodiment of the present invention about the transmission of A/N information to be explained includes the transmission of A/N information on a PDSCH transmitted in a downlink subframe or on a PDCCH indicating Semi-Persistent Scheduling (SPS) release.

Figure 5:
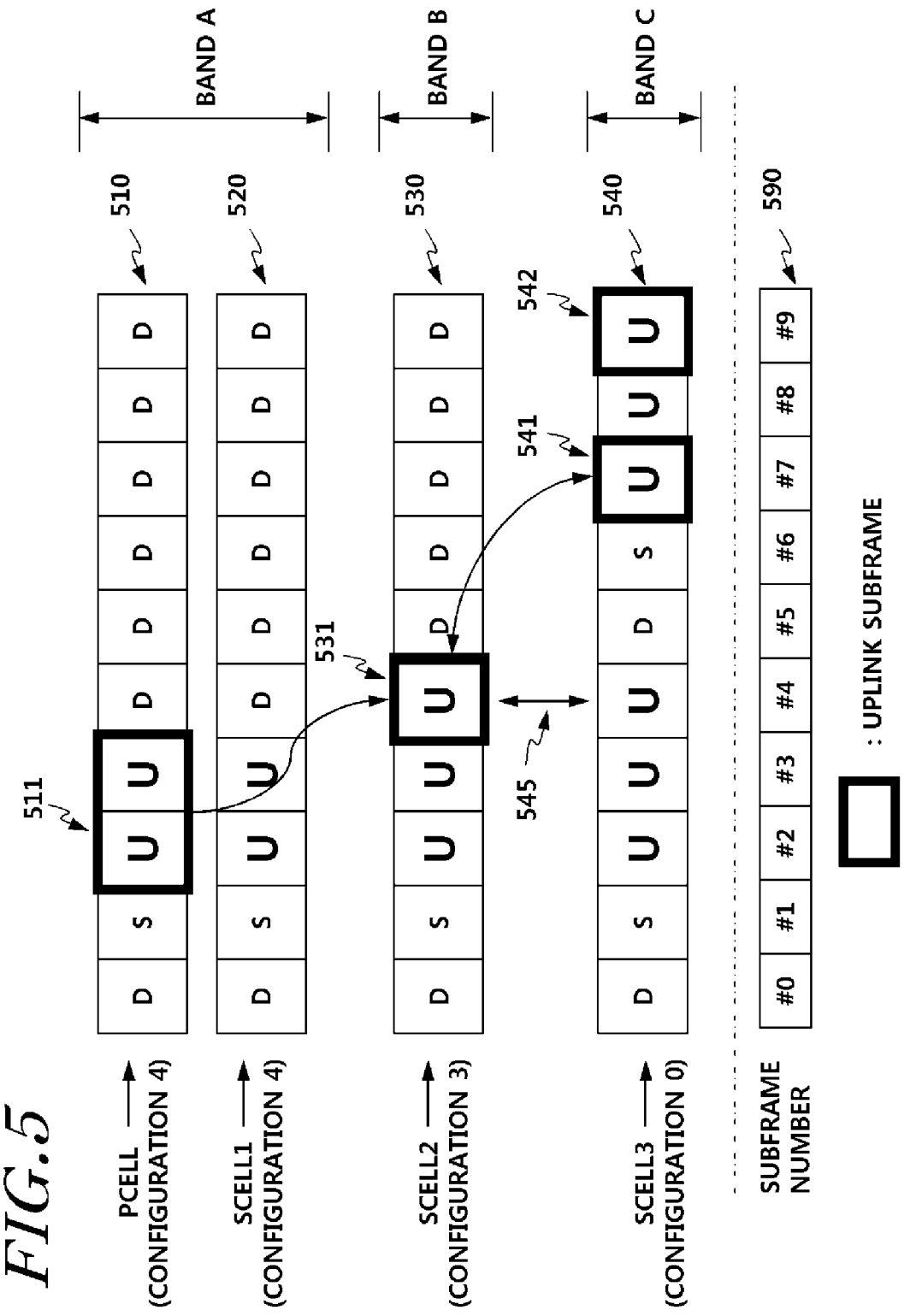
FIG. 5 is a view illustrating a process for switching between a PCell and an SCell in order to provide a dynamic A/N timing, according to an embodiment of the present invention.

FIG. 5 is a view illustrating a process for switching between a PCell and an SCell in order to provide a dynamic A/N timing, according to an embodiment of the present invention. FIG. 5 illustrates a structure of a component carrier set including four cells.

First, in the case of a PCell 510, when a HARQ A/N timing is defined for subframes #2 and #3 in an uplink subframe 511, A/N for a PDSCH transmitted through all component carriers on the PCell is transmitted in a relevant uplink subframe of the PCell.

However, when an uplink subframe does not exist in the PCell but exists in only the SCells, switching can be performed, for example, in case of an SCell2 530 and an SCell3 540 so as not to transmit A/N on the PCell but to transmit A/N on an SCell.

At this time, when an uplink HARQ A/N timing of SCell2 collides with that of SCell3 as designated by reference numeral 545, a selection can be made based on various criteria. For example, when HARQ A/N information is scheduled to be transmitted on an SCell having the lowest SCell index, the A/N information is transmitted in an uplink subframe 531. Otherwise, collision between SCells may be solved by setting the priority of the SCells through Radio Resource Control (RRC) signaling. Otherwise, the priority of the SCells may be predefined in a network.

In FIG. 5, the subframe #4 531 of SCell2 is overlapped on a subframe #4 of SCell3 in terms of the uplink timing 545, and thus HARQ A/N information is transmitted in the subframe #4 531 of SCell2. Because an uplink subframe does not exist in the PCell 510 and the SCells 520 and 530, HARQ A/N can be transmitted in a subframe #7 541 and a subframe #9 542 of SCell3 without uplink timings collision.

A method as illustrated in FIG. 5 enables the UE, to which a scheme illustrated in FIG. 5 can be merely applied without changing the existing HARQ A/N timing, to transmit HARQ A/N on an SCell, and thereby the efficiency of HARQ A/N transmission can be easily obtained from a scenario capable of causing a TDD configuration to be different for each component carrier. Also, the method as illustrated in FIG. 5 does not require any change in a PDSCH HARQ A/N timing. Reference numeral 590 represents subframe numbers of each cell.

Figure 6:
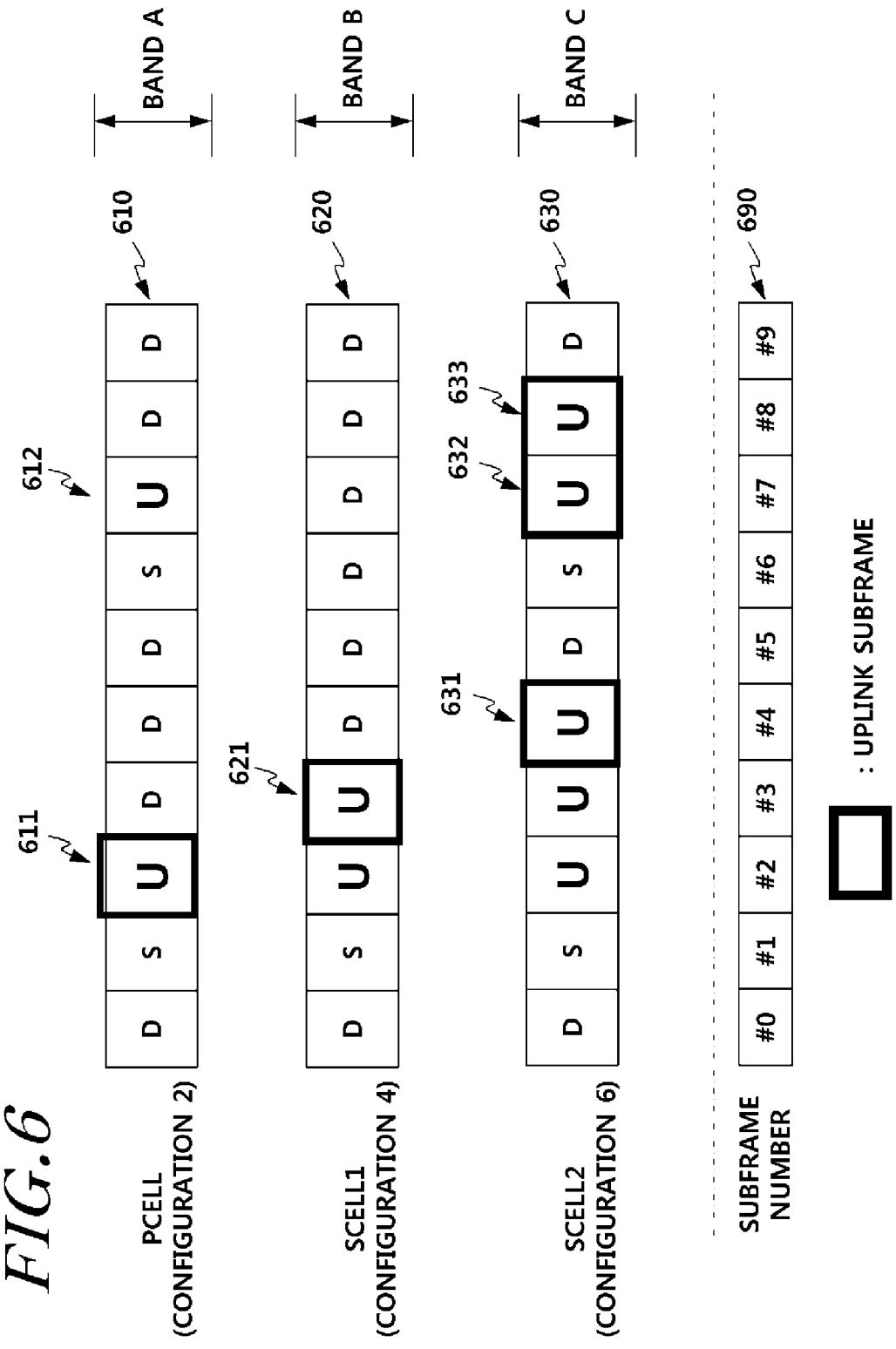
FIG. 6 is a view illustrating a process for switching between a PCell and an SCell in order to provide a dynamic A/N timing, according to another embodiment of the present invention.

FIG. 6 is a view illustrating a process for switching between a PCell and an SCell in order to provide a dynamic A/N timing, according to another embodiment of the present invention. FIG. 6 illustrates a structure of a component carrier set including three cells.

FIG. 6 illustrates three bands (band A, band B, and band C). Referring to FIG. 6, a TDD configuration in each band is such that a configuration of 2 is set for a PCell1 610, a configuration of 4 is set for an SCell1 620, and a configuration of 6 is set for an SCell2 630.

A HARQ A/N timing is defined for a subframe #2 with respect to an uplink subframe 611 in the PCell 610, and A/N for a PDSCH transmitted through all component carriers is transmitted in the relevant uplink subframe 611 of the PCell.

However, when an uplink subframe does not exist in the PCell but exists in only the SCells (i.e., in the case of uplink subframes 621 and 631), A/N is transmitted on the SCells. It is possible to prevent uplink HARQ A/N timings collision with each other in a particular subframe using predetermined information between the UE and the BS, CC index, or RRC configuration.

Meanwhile, in terms of a time point of an uplink subframe #7, an uplink subframe 612 also exists in the PCell, and an uplink subframe 632 also exists in SCell2. Various selection criteria can also be applied to this case.

In view of one of the various selection criteria, when a preceding uplink subframe and a following uplink subframe exist with a subframe in which uplink HARQ A/N timings collide with each other as a reference, A/N information may be transmitted in an uplink subframe of a cell in which the relevant uplink subframes exist.

In FIG. 6, when the uplink subframe #7 612 of the PCell is considered as a reference, both a preceding subframe (i.e., subframe #6) and a following subframe (i.e., subframe #8) exist as downlink subframes, and only one uplink subframe (i.e. subframe #7) exists. However, because a subframe #7 632 preceding an uplink subframe #8 633 of SCell2 is an uplink subframe, the two subframes exist as consecutive uplink subframes. Accordingly, for the efficiency of A/N transmission, A/N can be transmitted in the subframes 632 and 633 of SCell2. Reference numeral 690 represents subframe numbers of each cell.

Figure 7:
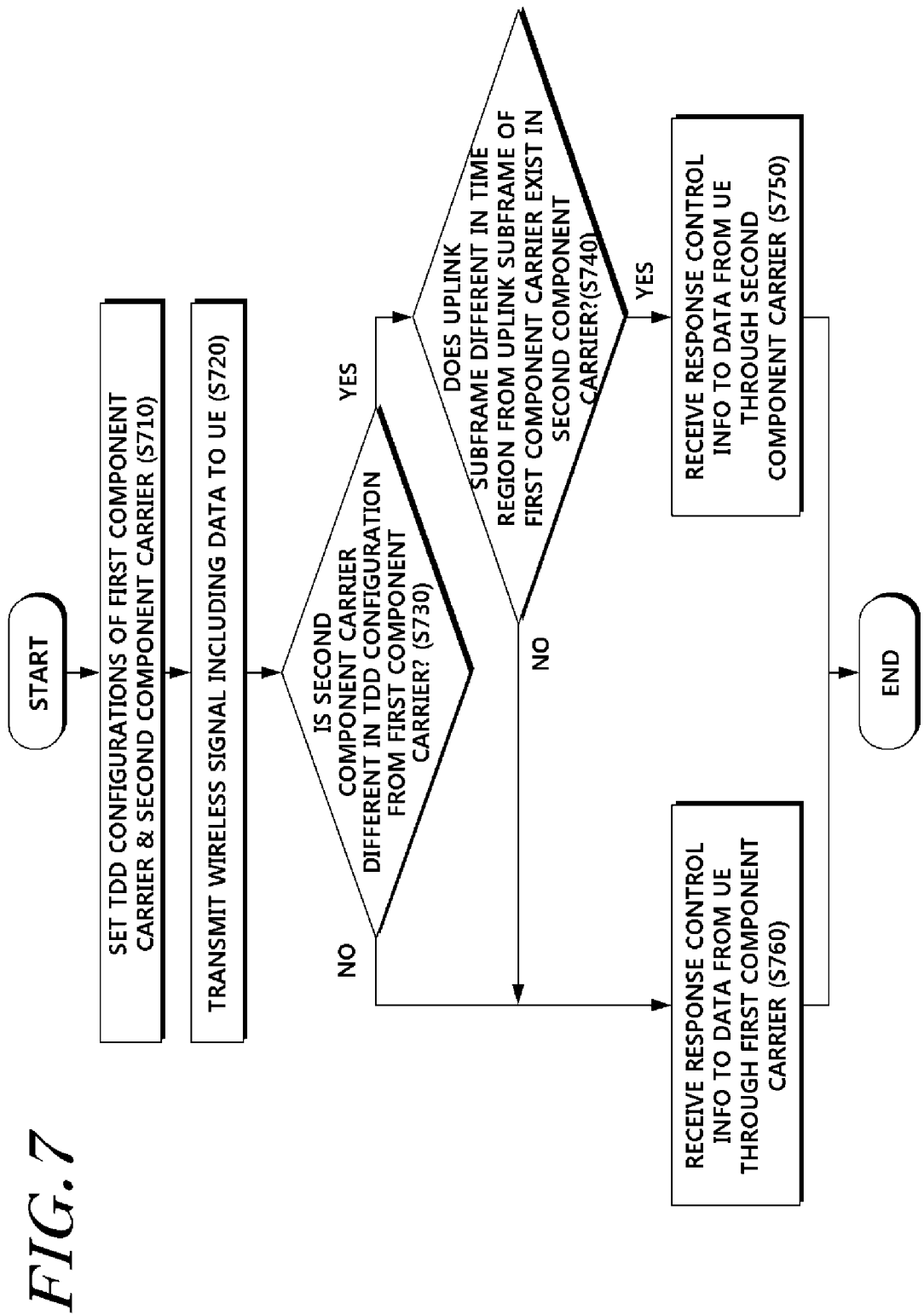
FIG. 7 is a flowchart illustrating a process in which a base station controls data traffic in a TDD system using multiple component carriers, according to an embodiment of the present invention.

FIG. 7 is a flowchart illustrating a process in which a base station controls data traffic in a TDD system using multiple component carriers, according to an embodiment of the present invention.

The BS sets a TDD scheme of a first component carrier and that of a second component carrier and gives an instruction on the set TDD schemes to the UE, in step S710. The term "TDD configuration (or TDD setting)" refers to the configuration of uplink/downlink subframes as described above in Table 1. Then, the BS transmits a wireless signal including data to the UE through any one or more component carriers from among a component carrier set including the first and second component carriers, in step S720. In FIG. 7, the wireless signal including data signifies the transmission of a PDSCH in downlink. The first component carrier may be a PCell, and the second component carrier may be an SCell.

Thereafter, there is a need for a process in which the BS receives response control information which is A/N of the UE for the transmitted PDSCH.

Response control information may be received in view of various cases. First, the BS determines whether the second component carrier is different in TDD configuration from the first component carrier, in step S730. In the case of an identical TDD configuration, as illustrated in FIG. 3, the BS receives response control information to the data from the UE through the first component carrier which is the PCell, in step S760. Meanwhile, when the second component carrier has a TDD configuration which is different from that of the first component carrier in terms of a structure of downlink and uplink subframes, the BS determines whether an uplink subframe which is different in time region from an uplink subframe of the first component carrier exists in the second component carrier, in step S740. When an uplink subframe which is different in time region from an uplink subframe of the first component carrier does not exist in the second component carrier, the BS receives response control information through the first component carrier, in step S760. This case signifies the case illustrated in FIG. 4. Whether time regions are different includes whether uplink subframes in respective component carriers are overlapped on each other in terms of time.

In contrast, when an uplink subframe which is different in time region from an uplink subframe of the first component carrier exists in the second component carrier, the BS receives response control information to the data from the UE through the second component carrier, in step S750.

When there exists a third component carrier overlapped on the second component carrier in terms of an uplink subframe in FIG. 7, it may be implemented to identify the second component carrier by using any one of a cell index of the second component carrier or the third component carrier, predetermined information between the BS and the UE, and RRC. Specifically, when there are multiple component carriers corresponding to SCells and uplink subframes capable of transmitting response control information exist in each of the multiple component carriers, examples of a selection scheme for transmitting response control information through one of the component carriers may include a method for using a highest index or a lowest index among cell indexes, a method for using a predetermined scheme between the UE and the BS, and the like.

Referring to FIG. 7, an uplink subframe different from that of the first component carrier exists in the second component carrier. Similarly, an uplink subframe different from that of the first component carrier also exists in the third component carrier.

Figure 8:
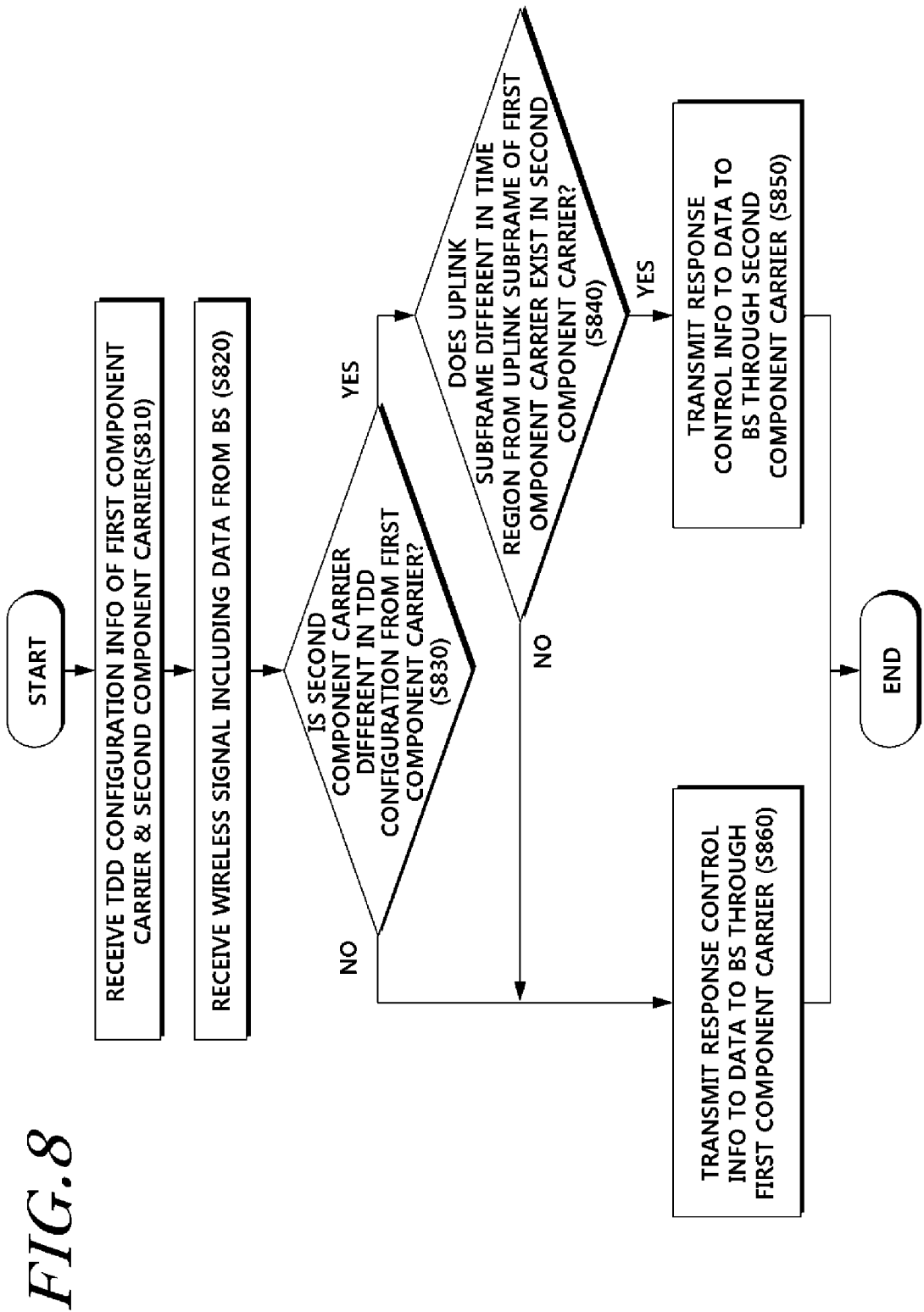
FIG. 8 is a flowchart illustrating a process in which a user equipment transmits response control information in such a manner as to control data traffic in a TDD system using multiple component carriers, according to an embodiment of the present invention.

FIG. 8 is a flowchart illustrating a process in which a UE transmits response control information in such a manner as to control data traffic in a TDD system using multiple component carriers, according to an embodiment of the present invention.

Referring to FIG. 8, the UE receives information on a TDD scheme of the first component carrier and that of the second component carrier that the BS has set, in step S810. A TDD configuration is a configuration of uplink/downlink subframes, as described in Table 1. Then, the UE receives a wireless signal including data from the BS through any one or more component carriers from among a component carrier set including the first and second component carriers, in step S820. The term "component carrier set" refers to a set of component carriers, which includes two or more component carriers configured (or set) for use between the UE and the eNB (or the BS). The first component carrier may be a PCell, and the second component carrier may be an SCell.

Thereafter, there is a need for a process in which the UE transmits response control information which is A/N for a received PDSCH.

In view of various cases, the UE can transmit response control information. First, the UE determines whether the second component carrier is different in TDD configuration from the first component carrier, in step S830. In the case of an identical TDD configuration, as illustrated in FIG. 3, the UE transmits response control information to the data to the BS through the first component carrier which is the PCell, in step S860. In contrast, when the second component carrier has a TDD configuration which is different from that of the first component carrier in terms of a structure of downlink and uplink subframes, the UE determines whether an uplink subframe which is different in time region from an uplink subframe of the first component carrier exists in the second component carrier, in step S840. When an uplink subframe which is different in time region from an uplink subframe of the first component carrier does not exist in the second component carrier, the UE transmits response control information to the BS through the first component carrier, in step S860. This case signifies the case illustrated in FIG. 4.

However, when an uplink subframe which is different in time region from an uplink subframe of the first component carrier exists in the second component carrier, the UE transmits response control information to the data to the BS through the second component carrier, in step S850.

When there exists a third component carrier overlapped on the second component carrier in terms of an uplink subframe in FIG. 8, it may be implemented to identify the second component carrier by using any one of a cell index of the second component carrier or the third component carrier, predetermined information between the UE and the BS, and RRC. Specifically, when there are multiple component carriers corresponding to SCells and uplink subframes capable of transmitting response control information exist in each of the multiple component carriers, examples of a selection scheme for transmitting response control information through one of the component carriers may include a method for using a highest index or a lowest index among cell indexes, a method for using a predetermined scheme between the UE and the BS, and the like.

The transmission and reception of response control information as illustrated in FIGS. 7 and 8 includes the transmission and reception of a wireless signal including the response control information.

In FIG. 8, an uplink subframe different from that of the first component carrier exists in the second component carrier. Similarly, an uplink subframe different from that of the first component carrier also exists in the third component carrier.

Hitherto, the description has been made of the process for transmitting response control information on even an SCell when different TDD configurations are set for component carriers in a TDD-CA environment. A configuration of the BS and that of the UE which implement the process will be described below.

Figure 9:
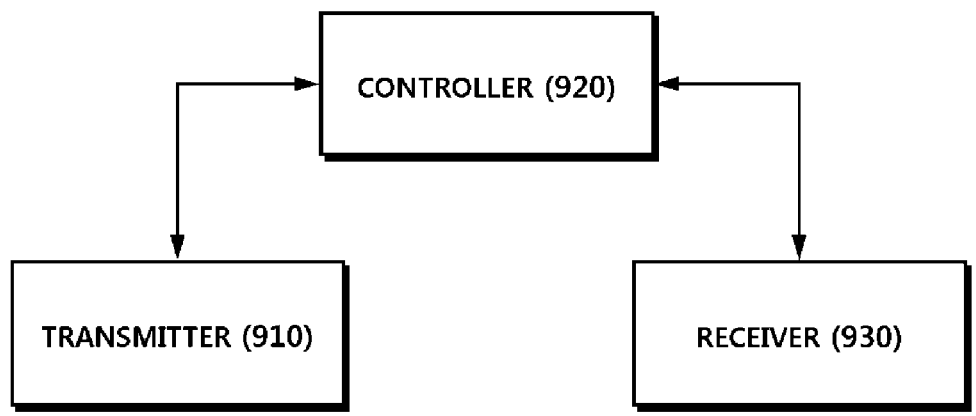
FIG. 9 is a block diagram illustrating a configuration of a base station according to an embodiment of the present invention.

FIG. 9 is a block diagram illustrating a configuration of a BS according to an embodiment of the present invention. Referring to FIG. 9, the BS includes a transmitter 910 for transmitting and receiving a wireless signal to/from the UE, a receiver 930, and a controller 920 for controlling the transmitter 910 and the receiver 930.

The controller 920 controls the transmitter 910 to transmit a wireless signal including data to the UE through any one or more component carriers from among a component carrier set including first and second component carriers in which uplink and downlink subframes are formed according to the TDD scheme, as described with reference to FIG. 7. Also, the controller 920 controls the receiver 930 to receive response control information to the data from the UE through the second component carrier. The term "component carrier set" refers to a set of component carriers, which includes two or more component carriers configured (or set) for use between the UE and the eNB (or the BS). Here, the second component carrier has a TDD configuration which is different from that of the first component carrier in a configuration of downlink and uplink subframes. More specifically, the first component carrier may be a PCell, and the second component carrier may be an SCell. In this case, it may be implemented that the first component carrier is different in frequency band from the second component carrier.

Also, when response control information is transmitted on multiple SCells, with respect to which SCell is to be used to transmit response control information among the multiple SCells, a component carrier of the SCell on which the response control information is to be transmitted can be selected by using any one of multiple cell indexes of component carriers which are SCells, predetermined information between the BS and the UE, and RRC.

Figure 10:
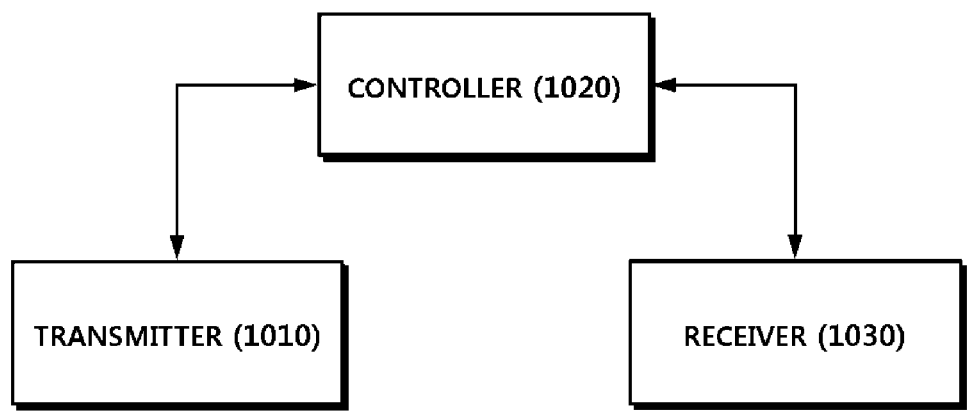
FIG. 10 is a block diagram illustrating a configuration of a user equipment according to an embodiment of the present invention.

FIG. 10 is a block diagram illustrating a configuration of a UE according to an embodiment of the present invention. Referring to FIG. 10, the UE includes a transmitter 1010 for transmitting and receiving a wireless signal to/from the BS, a receiver 1030, and a controller 1020 for controlling the transmitter 1010 and the receiver 1030.

The controller 1020 controls the receiver 1030 to receive a wireless signal including data from the BS through any one or more component carriers from among a component carrier set including first and second component carriers in which uplink and downlink subframes are formed according to the TDD scheme, as described with reference to FIG. 8. The term "component carrier set" refers to a set of component carriers, which includes two or more component carriers configured (or set) for use between the UE and the eNB (or the BS). Also, the controller 1020 controls the transmitter 1010 to transmit a wireless signal including response control information to the data to the BS through the second component carrier.

Here, the second component carrier has a TDD configuration which is different from that of the first component carrier in a configuration of downlink and uplink subframes. More specifically, the first component carrier may be a PCell, and the second component carrier may be an SCell. In this case, it may be implemented that the first component carrier is different in frequency band from the second component carrier.

Also, when response control information is transmitted on multiple SCells, with respect to which SCell is to be used to transmit response control information among the multiple SCells, a component carrier of the SCell on which the response control information is to be transmitted can be selected by using any one of multiple cell indexes of component carriers which are SCells, predetermined information between the UE and the BS, and RRC.

Hereinafter, a process for transmitting response control information on multiple cells when different TDD configurations are applied to the multiple cells will be described with reference to the relevant drawings.

Figure 11:
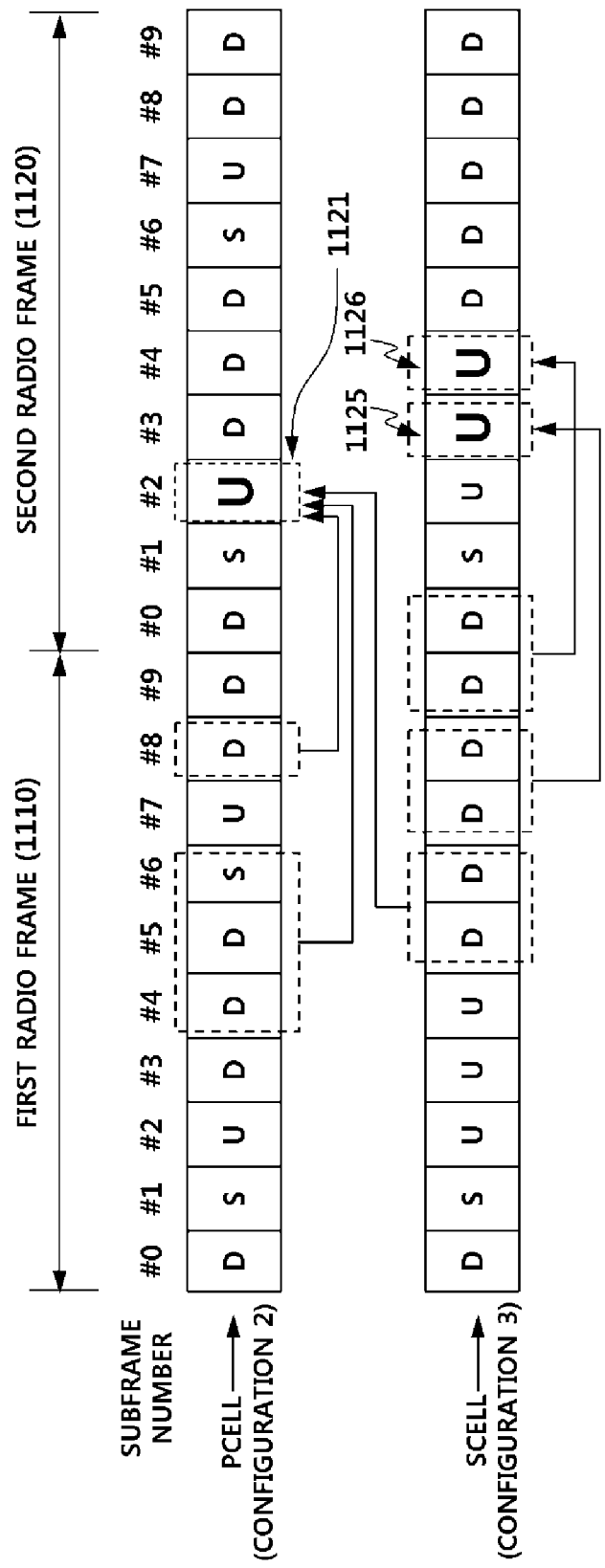
FIG. 11 illustrates an example of transmitting A/N in such a manner as to switch between cells while maintaining an A/N timing mapping relation between downlink and uplink shown in Table 2, according to an embodiment of the present invention.

FIG. 11 illustrates an example of transmitting A/N in such a manner as to switch between cells while maintaining an A/N timing mapping relation between downlink and uplink shown in Table 2, according to an embodiment of the present invention. FIG. 11 illustrates a structure of a component carrier set including two cells.

FIG. 11 is a view illustrating a process for transmitting response control information on multiple cells when different TDD configurations are applied to the multiple cells, according to an embodiment of the present invention.

Referring to FIG. 11, an example of the structure of a PCell and an SCell which are two cells is described. The PCell complies with TDD configuration 2 shown in Table 1, and the SCell complies with TDD configuration 3 shown in Table 1. The case illustrated in FIG. 11 is a case in which different TDD configurations are set for respective cells, which has been described in this specification. 20 subframes are proposed where a unit is composed of 10 subframes in TDD configuration as a reference. A first radio frame 1110 and a second radio frame 1120 are proposed. In describing an example to which an embodiment of the present invention is applied, the following description will focus on an uplink subframe of the second radio frame 1120.

Also, a description will be made of which downlink subframe is used to transmit response control information among an uplink subframe #2 1121 of the PCell, and an uplink subframe #3 1125 and an uplink subframe #4 1126 of the SCell in the second radio frame 1120.

In the case of complying with a configuration shown in Table 2, downlink subframes which precede by 8, 7, 4 and 6 with the uplink subframe #2 1121 of the PCell as a reference, are mapped to the uplink subframe #2 1121 of the PCell. Downlink subframes which precede by 6 and 5 with the uplink subframe #3 1125 of the SCell as a reference, are mapped to the uplink subframe #3 1125 of the SCell. Downlink subframes which precede by 5 and 4 with the uplink subframe #4 1126 of the SCell as a reference, are mapped to the uplink subframe #4 1126 of the SCell.

When the mapping is considered, downlink subframe #4, downlink subframe #5, downlink subframe #6 and downlink subframe #8 of the first radio frame 1110 are mapped to the uplink subframe #2 1121 of the PCell, downlink subframe #7 and downlink subframe #8 of the first radio frame 1110 are mapped to the uplink subframe #3 1125 of the SCell, and downlink subframe #9 of the first radio frame 1110 and downlink subframe #0 of the second radio frame 1120 are mapped to the uplink subframe #4 1126 of the SCell.

FIG. 11 illustrates a mapping relation for transmitting A/N information in uplink subframes of the PCell and the SCell according to the mapping.

Specifically, according to an embodiment of the present invention, response control information to a PDSCH transmitted in subframe #5 and subframe #6 of the first radio frame 1110 of the SCell is transmitted in the uplink subframe #2 1121 of the second radio frame 1120 of the PCell. However, response control information to a PDSCH transmitted in subframe #7 and subframe #8 of the first radio frame 1110 of the SCell is transmitted in the uplink subframe #3 1125 of the second radio frame 1120 of the SCell. Response control information to a PDSCH transmitted in subframe #9 of the first radio frame 1110 of the SCell and subframe #0 of the second radio frame 1120 of the SCell is transmitted in the uplink subframe #4 1126 of the second radio frame 1120 of the SCell.

When, as illustrated in FIG. 11, the PCell is different in TDD configuration from the SCell and there exist uplink subframes #3 and #4 of the SCell which are not included in a time region of an uplink subframe of the PCell, it is implemented to enable the transmission of response control information, so that more efficient response control information can be transmitted. In other words, response control information can be transmitted even in an uplink subframe of the SCell, and thereby it is possible to operate more efficient HARQ-ACK than in a case where response control information is transmitted in only an uplink subframe of the PCell.

In FIG. 11, subframe #8 of the first radio frame 1110 of the SCell may also be mapped to the uplink subframe 1121 of the PCell.

Figure 12:
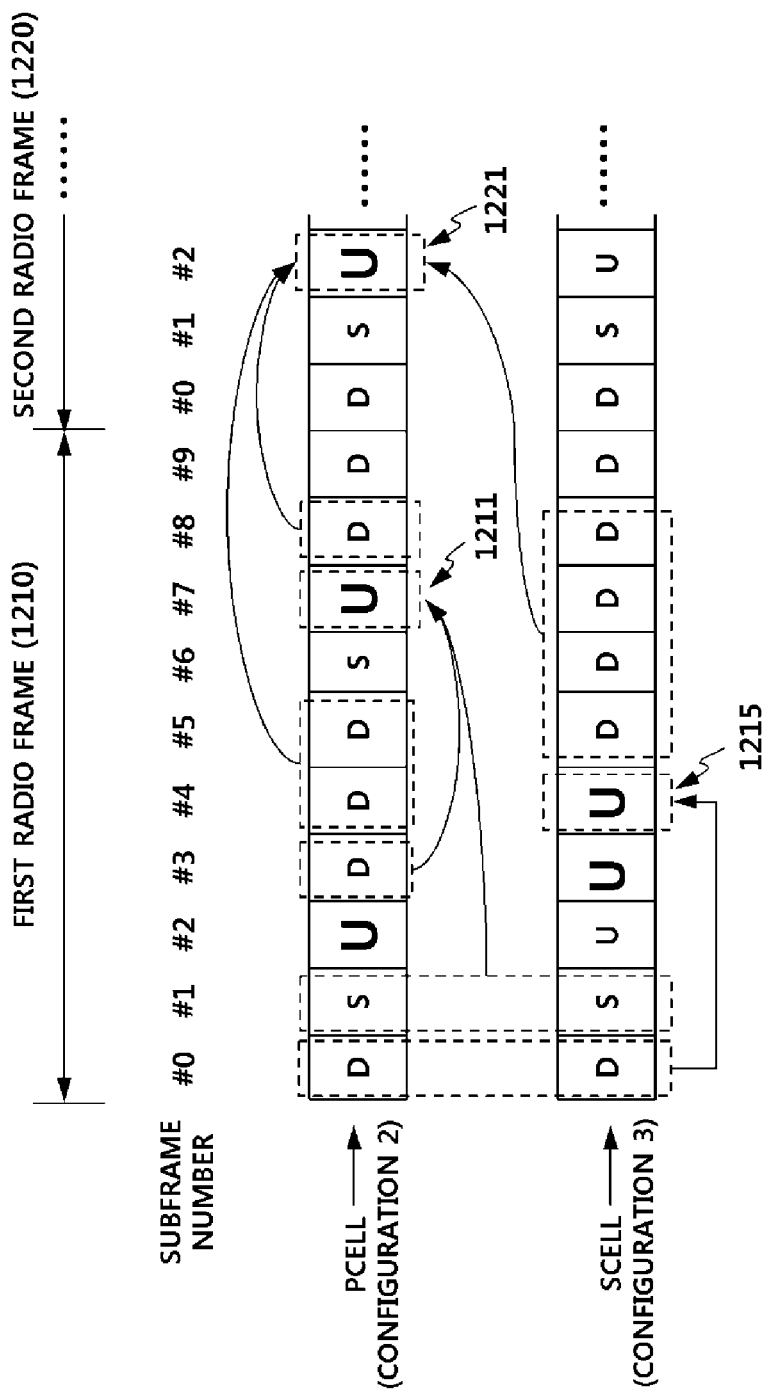
FIG. 12 is a view illustrating a process for transmitting response control information when different TDD configurations are applied to multiple cells without considering a mapping relation, according to another embodiment of the present invention.

FIG. 12 is a view illustrating a process for transmitting response control information when different TDD configurations are applied to multiple cells without considering a mapping relation, according to another embodiment of the present invention. In order to compare FIG. 12 with FIG. 11, the configuration illustrated in FIG. 11 is used as it is. FIG. 12 illustrates a structure of a component carrier set including two cells.

An embodiment of the present invention as illustrated in FIG. 12 does not consider the downlink-uplink mapping relation shown in Table 2. Specifically, when uplink subframe #n exists, transmission can be performed in each of preceding downlink subframes, which start from a subframe (i.e., subframe #(n−4)) preceding by 4 with uplink subframe #n as a reference and end before uplink subframe #n, and in uplink subframe #n. When a PCell (i.e., a PCC) and an SCell (i.e., an SCC) both have an uplink subframe as subframe #n, A/N may be transmitted in an uplink subframe of the PCell (i.e., the PCC).

With reference to FIG. 12, a description will be made below of downlink subframes which are mapped to an uplink subframe 1215 of the SCell, and downlink subframes which are mapped to uplink subframes 1211 and 1221 of the PCell.

An uplink subframe #4 1215 exists in a first radio frame 1210 of the SCell, and can be used to transmit A/N for a PDSCH or A/N for a PDCCH indicating SPS release, which is transmitted in a downlink subframe (i.e., downlink subframe #0 of the first radio frame 1210) preceding by 4 with the uplink subframe #4 1215 as a reference. Meanwhile, the uplink subframe #7 1211 of the first radio frame 1210 of the PCell can be used to transmit A/N for a PDSCH or A/N for a PDCCH indicating SPS release, which is transmitted in downlink subframes #1 and #3 of the first radio frame 1210.

Meanwhile, the uplink subframe #2 1221 of the second radio frame 1220 of the PCell can be used to transmit A/N for a PDSCH or A/N for a PDCCH indicating SPS release, which is transmitted in downlink subframes #4, #5 #6, #7 and #8 of the first radio frame 1210.

Also, a technique is embodied for repeatedly transmitting A/N for a PDSCH or A/N for a PDCCH indicating SPS release, which is transmitted in a particular downlink subframe The repeated transmission of A/N is referred to as "A/N repetition." Specifically, when the A/N repetition is enabled, identical A/N information may be repeatedly transmitted by the number of times equal to N_rep in an uplink subframe which is first located after a first transmitted uplink subframe. Here, N_rep represents the number of times when identical A/N information is repeatedly transmitted in multiple uplink subframes through RRC signaling. Accordingly, when transmission which is repeated two times is set (i.e., N_rep=2), A/N information is first transmitted in uplink subframe n, and is also transmitted in an uplink subframe which is first located after uplink subframe n. At this time, according to an embodiment of the present invention, the transmission of an uplink subframe through all component carriers may be considered. Also, when uplink subframe n_1 first located after uplink subframe n has A/N information on uplink subframe n_1 which is to be transmitted in uplink subframe n_1, the A/N information on uplink subframe n_1 is not transmitted but information identical to the A/N information transmitted in preceding uplink subframe n may be transmitted in uplink subframe n_1.

Figure 13:
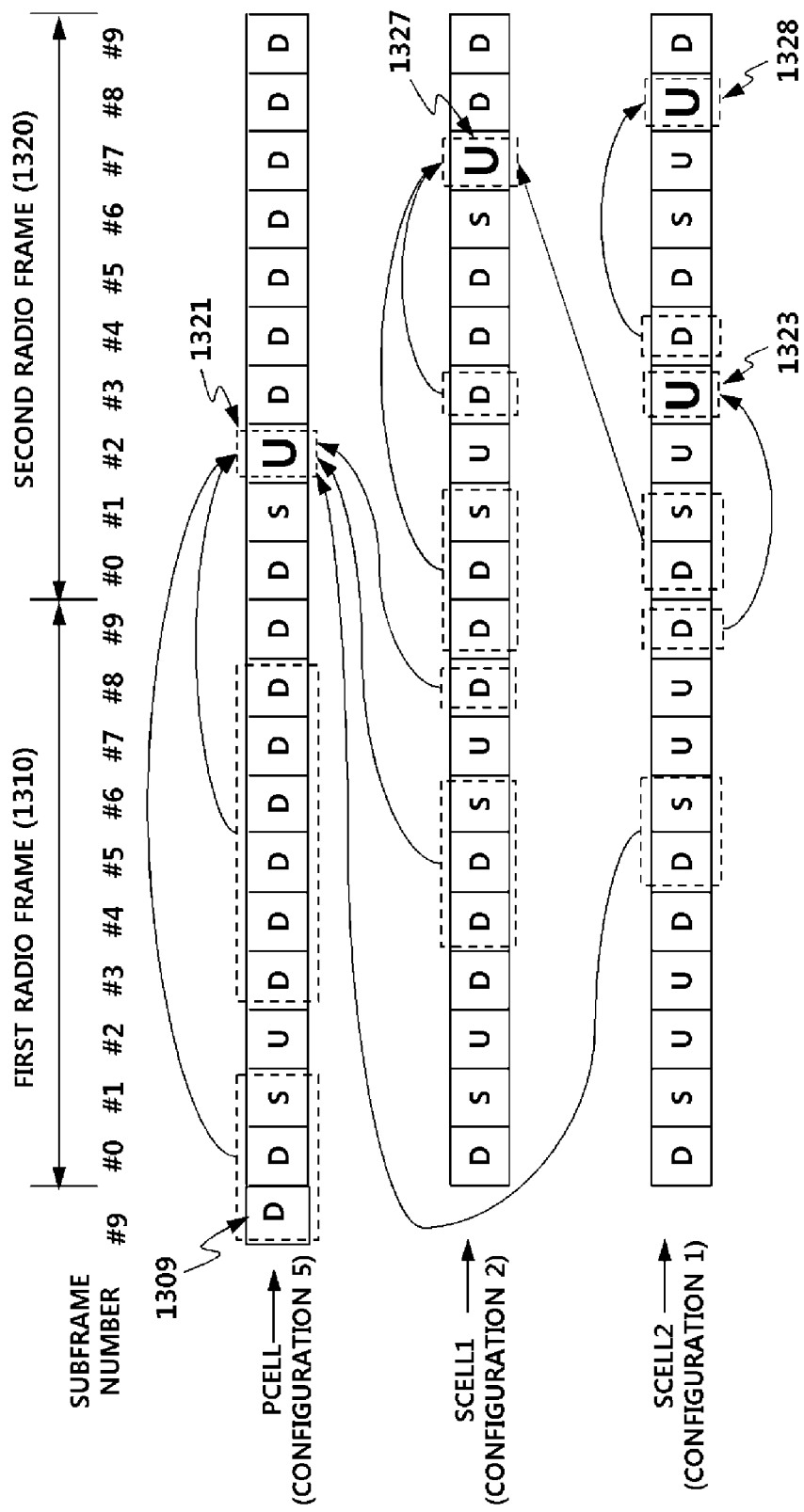
FIG. 13 is a view illustrating a process for transmitting response control information when different TDD configurations are applied to multiple cells, according to another embodiment of the present invention.

FIG. 13 is a view illustrating a process for transmitting response control information when different TDD configurations are applied to multiple cells, according to another embodiment of the present invention.

FIG. 13 illustrates an embodiment of the present invention in a case to which the downlink-uplink mappings in Table 2 as described above are applied. FIG. 13 illustrates a structure of a component carrier set including three cells.

Referring to FIG. 13, the component carrier set includes a PCell which includes three cells; SCell1; and SCell2. The PCell complies with TDD configuration 5 shown in Table 1, SCell1 complies with TDD configuration 2 shown in Table 1, and SCell2 complies with TDD configuration 1 shown in Table 1. The case illustrated in FIG. 13 is a case in which different TDD configurations are set for respective cells, which has been described in this specification. 20 subframes are proposed where a unit is composed of 10 subframes in TDD configuration as a reference, and two radio frames 1310 and 1320 exist. In FIG. 13, when there are two or more uplink subframes capable of transmitting response control information, a cell having a lower cell index is first selected. Accordingly, selection is made in an order of the PCell, SCell1 and SCell2.

Configuration 5 of the PCell enables the transmission of response control information in downlink subframes preceding by 13, 12, 9, 8, 7, 5, 4, 11 and 6 with subframe #2 as a reference. Accordingly, in the PCell, response control information of a downlink subframe #9 1319 of a radio frame preceding a first radio frame 1310 and response control information of downlink subframes #0, #1, #3, #4, #5, #6, #7 and #8 of the first radio frame 1310 are transmitted in an uplink subframe #2 1321.

Meanwhile, SCell1 and SCell2 are used to transmit A/N information (i.e., response control information) to downlink subframes in which A/N has not been transmitted among downlink subframes preceding by 13, 12, 9, 8, 7, 5, 4, 11 and 6 in the uplink subframe #2 1321 as a reference. Response control information to downlink subframes #4, #5, #6 and #8 of the first radio frame 1310 of SCell1 is transmitted in the uplink subframe #2 1321. Response control information to downlink subframes #5 and #6 of the first radio frame 1310 of SCell2 is transmitted in the uplink subframe #2 1321.

Meanwhile, configuration 2 of SCell1 allows the transmission of response control information of downlink subframes preceding by 8, 7, 4 and 6 with subframes #2 and #7 of the second radio frame 1320 as a reference. Because uplink subframe #2 of SCell1 is a part which collides with PCell1, response control information of downlink subframes #4, #5, #6 and #8 of the second radio frame 1320 of SCell1 is transmitted in the uplink subframe 1321 of the PCell, as described above. In contrast, response control information of downlink subframe #9 of the first radio frame 1310 of SCell1 and response control information of downlink subframes #0, #1 and #3 of the second radio frame 1320 of SCell1 are transmitted in an uplink subframe #7 1327 of SCell1.

Meanwhile, SCell2 has configuration 1, and subframes #2, #3, #7 and #8 of SCell2 are uplink subframes. At this time, uplink subframe #2 of SCell2 collides with the uplink subframe #2 1321 of PCell1, and uplink subframe #7 of SCell2 collides with uplink subframe #7 1337 of SCell1. However, the subframe #3 1353 and the subframe #8 1358 of SCell2 do not collide with uplink subframes of another cell, and thus may be used to transmit response control information.

The uplink subframe #3 1323 of SCell2 is used to transmit response control information of a downlink subframe preceding by 4 with the uplink subframe #3 1323 as a reference. Accordingly, the uplink subframe #3 1323 of SCell2 is used to transmit response control information of downlink subframe #9 of the first radio frame 1310 of SCell2. Similarly, the uplink subframe #8 1328 of SCell2 is used to transmit response control information of a downlink subframe preceding by 4 with the uplink subframe #8 1328 of SCell2 as a reference. Accordingly, the uplink subframe #8 1328 of SCell2 may be used to transmit response control information of downlink subframe #4 of the second radio frame 1320 of SCell2.

FIG. 14 is a view illustrating a process for transmitting response control information when different TDD configurations are applied to multiple cells, according to still another embodiment of the present invention. In FIG. 14, configurations of a PCell, SCell1 and SCell2 are identical to those illustrated in FIG. 13. FIG. 14 illustrates a structure of a component carrier set including three cells.

FIG. 14 illustrates an embodiment of the present invention in a case, to which the downlink-uplink mappings in Table 2 as described above are not applied, and in which transmission is performed on A/N information to a PDSCH or A/N information to a PDCCH indicating SPS release, which is transmitted in downlink subframes which start from a downlink subframe preceding by 4 with an uplink subframe as a reference and end before the uplink subframe.

Uplink subframes in which response control information is transmitted are designated by reference numerals 1323, 1327 and 1328. Uplink subframe #2 of a second radio frame 1420 of a PCell is used to transmit response control information of downlink subframes of a first radio frame 1410. Accordingly, a description thereof will be omitted.

The uplink subframe 1323 of SCell2 is used to transmit response control information of downlink subframe #9 of the first radio frame 1410, which precedes by 4 with the uplink subframe 1323 of SCell2 as a reference.

Then, the uplink subframe 1327 of SCell1 is used to transmit response control information of subframes #0, # and #3 of the second radio frame 1420, which includes a subframe preceding by 7 with the uplink subframe 1327 of SCell1 as a reference.

Next, the uplink subframe 1328 of SCell2 is used to transmit response control information of subframe #4 of the second radio frame 1420, which precedes by 4 with the uplink subframe 1328 of SCell2 as a reference.

In this specification, it is possible to effectively operate HARQ-ACK when different TDD configurations are applied to multiple cells. Particularly, when a small number of subframes are allocated to uplink of a PCell, A/N can be transmitted on another SCell, so that it is possible to efficiently operate a network.

The above description is only an illustrative description of the technical idea of the present invention, and those having ordinary knowledge in the technical field, to which the present invention pertains, will appreciate that various changes and modifications may be made to the embodiments described herein without departing from the essential features of the present invention. Therefore, the embodiments disclosed in the present invention are intended not to limit but to describe the technical idea of the present invention, and thus do not limit the scope of the technical idea of the present invention. The protection scope of the present invention should be construed based on the appended claims, and all of the technical ideas included within the scope equivalent to the appended claims should be construed as being included within the right scope of the present invention.

The invention claimed is:

1. A method for controlling data traffic by a base station in a Time Division Duplex (TDD) system using multiple component carriers, the method comprising:
    transmitting a wireless signal including data to a user equipment through any one or more component carriers in a component carrier set which comprises a first component carrier corresponding to a primary cell and a second component carrier corresponding to a secondary cell, in which uplink and downlink subframes are configured according to a TDD scheme; and
    receiving a wireless signal including response control information to the data from the user equipment through the second component carrier,
    wherein the second component carrier is different in band from the first component carrier, the second component carrier has a TDD configuration which is different from a TDD configuration of the first component carrier in terms of a structure of downlink and uplink subframes, and an uplink subframe different from an uplink subframe of the first component carrier exists in the second component carrier.

2. The method as claimed in claim 1, wherein when there exists a third component carrier which is overlapped on the second component carrier in terms of an uplink subframe and includes a subframe different from an uplink subframe of the first component carrier, the base station controls the user equipment to identify the second component carrier by using any one of a cell index of the second component carrier or the third component carrier, predetermined information between the base station and the user equipment, and radio resource control.

3. The method as claimed in claim 1, further comprising receiving the wireless signal including the response control information to the data from the user equipment through the first component carrier, when an uplink subframe which is different in time region from an uplink subframe of the first component carrier does not exist in the second component carrier.

4. A method for controlling data traffic by a user equipment in a Time Division Duplex (TDD) system using multiple component carriers, the method comprising:
    receiving a wireless signal including data from a base station through any one or more component carriers in a component carrier set which comprises a first component carrier corresponding to a primary cell and a second component carrier corresponding to a secondary cell, in which uplink and downlink subframes are configured according to a TDD scheme; and
    transmitting a wireless signal including response control information to the data to the base station through the second component carrier,
    wherein the second component carrier is different in band from the first component carrier, the second component carrier has a TDD configuration which is different from a TDD configuration of the first component carrier in terms of a structure of downlink and uplink subframes, and an uplink subframe different from an uplink subframe of the first component carrier exists in the second component carrier.

5. The method as claimed in claim 4, wherein when there exists a third component carrier which is overlapped on the second component carrier in terms of an uplink subframe and in which there exists a subframe different from an uplink subframe of the first component carrier, the second component carrier is capable of being identified by using any one of a cell index of the second component carrier or the third component carrier, predetermined information between the user equipment and the base station, and radio resource control.

6. The method as claimed in claim 5, further comprising transmitting the wireless signal including the response control information to the data to the base station through the first component carrier, when an uplink subframe which is different in time region from an uplink subframe of the first component carrier does not exist in the second component carrier.

7. A base station comprising:
    a transmitter to transmit a wireless signal to a user equipment;
    a receiver to receive a wireless signal from the user equipment; and
    a controller to control a transmitter to transmit a wireless signal including data to a user equipment through any one or more component carriers in a component carrier set which comprises a first component carrier corresponding to a primary cell and a second component carrier corresponding to a secondary cell, in which uplink and downlink subframes are configured according to a Time Division Duplex (TDD) scheme, and to control the receiver to receive response control information to the data from the user equipment through the second component carrier,
    wherein the second component carrier is different in band from the first component carrier, the second component carrier has a TDD configuration which is different from a TDD configuration of the first component carrier in terms of a structure of downlink and uplink subframes, and an uplink subframe different from an uplink subframe of the first component carrier exists in the second component carrier.

8. A user equipment comprising:
a transmitter to transmit a wireless signal to a base station;
a receiver to receive a wireless signal from the base station; and
a controller to control the receiver to receive a wireless signal including data from the base station through any one or more component carriers in a component carrier set which comprises a first component carrier corresponding to a primary cell and a second component carrier corresponding to a secondary cell, in which uplink and downlink subframes are configured according to a Time Division Duplex (TDD) scheme, and to control a transmitter to transmit a wireless signal including response control information to the data to the base station through the second component carrier,
wherein the second component carrier is different in band from the first component carrier, the second component carrier has a TDD configuration which is different from a TDD configuration of the first component carrier in terms of a structure of downlink and uplink subframes, and an uplink subframe different from an uplink subframe of the first component carrier exists in the second component carrier.

* * * * *